United States Patent
Fürst et al.

[11] Patent Number: 6,074,618
[45] Date of Patent: Jun. 13, 2000

[54] DEVICE FOR REMOVING HYDROGEN FROM A GAS MIXTURE AND ITS USE

[75] Inventors: Leander Fürst; Herbert Neumesiter; Reinhold Flucht, all of Jülich, Germany

[73] Assignee: Forschungszentrum Julich GmbH, Germany

[21] Appl. No.: 09/091,587

[22] PCT Filed: Dec. 16, 1996

[86] PCT No.: PCT/DE96/02418

§ 371 Date: Jul. 13, 1998

§ 102(e) Date: Jul. 13, 1998

[87] PCT Pub. No.: WO97/23412

PCT Pub. Date: Jul. 3, 1997

[30] Foreign Application Priority Data

Dec. 22, 1995 [DE] Germany ............ 195 48 235

[51] Int. Cl.[7] .................................. B01D 53/34
[52] U.S. Cl. ............................ 422/198; 422/211
[58] Field of Search .................. 422/173, 177, 422/180, 198, 211

[56] References Cited

U.S. PATENT DOCUMENTS 2,943,921  7/1960  King ........................... 422/117
4,297,319  10/1981  Ishibashi et al. ............. 422/114

*Primary Examiner*—Marian C. Knode
*Assistant Examiner*—Frederick Varcoe
*Attorney, Agent, or Firm*—Connolly Bove Lodge & Hutz

[57] ABSTRACT

The invention relates to a device for removing hydrogen from a gas mixture containing free hydrogen and oxygen by means of catalytic oxidation of the hydrogen in a reaction chamber (6) having a support (1) secured in the reaction chamber and coated on its surface (2) with catalytically active materials, serving to dissipate reaction heat, and also with an inlet (7) into the reaction chamber for the gas mixture and with an outlet (10) for residual gas that remains after the oxidation of the hydrogen. A part (5) of the catalytically active surface (2) of the support (1) is immersed into a liquid bath (3), the temperature of which is below the condensation temperature of the water vapor formed in the reaction chamber (6). The liquid inlet (7) for the liquid bath (3) concurrently serves as the inlet for the gas mixture to be fed into the reaction chamber and a liquid outlet (10) concurrently serves as an outlet for the residual gas, and both the liquid inlet (7) and the liquid outlet (10) are situated below the liquid level (8) in the reaction chamber (6) and whereby the pressure in the reaction chamber can be controlled.

3 Claims, 1 Drawing Sheet

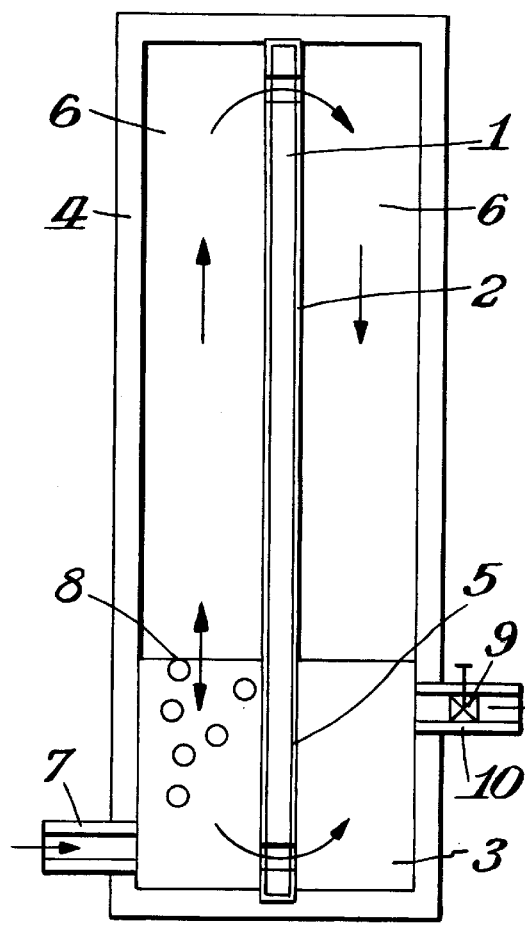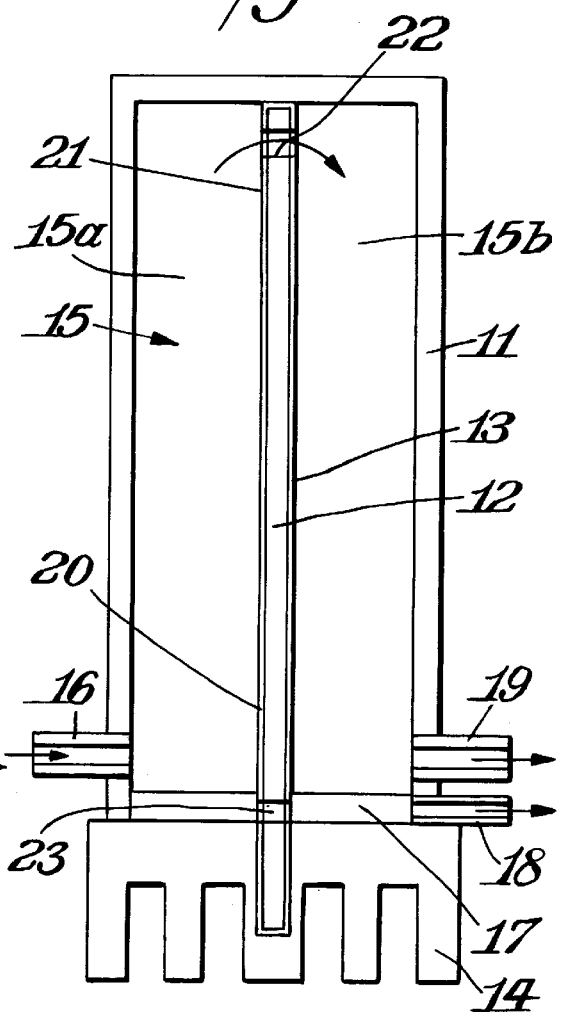

DEVICE FOR REMOVING HYDROGEN FROM A GAS MIXTURE AND ITS USE

The invention relates to a device for removing hydrogen from a gas mixture containing free hydrogen and oxygen by means of catalytic oxidation of the hydrogen. For this purpose, a support whose surface is coated with catalytically active material is secured in a reaction chamber that is suitable for oxidation. The support not only serves as a catalyst support, but it especially serves to dissipate the reaction heat that is released during the exothermal catalytic hydrogen oxidation. The gas mixture is fed into the reaction chamber through an inlet while the residual gas that remains after the oxidation of the hydrogen flows out of the reaction chamber via an outlet. Another subject matter of the invention is the use of said device.

The catalytic reaction of hydrogen present in an explosive gas mixture of hydrogen and oxygen is known. Catalytic oxidation makes it possible to prevent oxyhydrogen explosions in the gas phase. The catalysis then has to be carried out below the ignition temperature of the gas mixture, that is to say, below approximately 600° C. [1112° F.] at atmospheric pressure. Sufficient heat dissipation must be ensured in order to prevent the temperature from rising above this ignition temperature. If, in addition to the reactants hydrogen and oxygen, the gas mixture also contains inert gas fractions that do not participate in the reaction, such as, for example, nitrogen, then heat is also used to heat up these inert gas fractions. Thus, the temperature of the gas mixture in the reaction chamber can be adjusted by adding air to the gas mixture. The temperature on the surface of the carrier is kept above 100° C. [212° F.] so that the water vapor formed during the reaction cannot condense on the support surface, since water films on the catalytically active surface reduce its catalytic activity.

A catalysis in the liquid phase is described in a publication by R. Wagner et al. titled "Catalytic removal of dissolved oxygen from water", in Ion Exch. Adv., Proc. IEX 92, 1992, pages 144 to 150. This publication describes a process to bind dissolved oxygen in water by introducing hydrogen gas. The catalytic reaction that takes place here can, of course, also be employed to bind hydrogen. Platinum and palladium (on supports made of activated charcoal, aluminum oxide or ion-exchanger resin) are used as the catalysts. In order to achieve a sufficient conversion on the supports, which are situated under water, the gases must be present in a form dissolved in water. Nevertheless, the rate of conversion remains low when the water bath is at room temperature or even at higher water temperatures, so that large catalyst surfaces are necessary if this process is to be utilized. The reaction heat is absorbed by the water bath.

Gas mixtures that contain free hydrogen and oxygen in a stoichiometric ratio and that are consequently extremely explosive are generated, for instance, during the electrolytic production of superpure water. The use of the above-mentioned, known methods of hydrogen oxidation in such processes, however, entails a considerable effort; in this context, see IPAD Catalyst 25/250 D and German laid-open application no. 3,909,540 A1.

The objective of the invention, on the one hand, is to obtain a high rate of conversion for the catalytic hydrogen oxidation while, on the other hand, ensuring sufficient heat dissipation.

This objective is achieved according to the invention with a device of the type mentioned above by means of two alternative embodiments.

In one embodiment, the support secured in the reaction chamber, together with part of its catalytically active surface, is immersed into a liquid bath that is at a temperature below the condensation temperature of the water vapor formed in the reaction chamber, whereby a liquid inlet for the liquid bath simultaneously serves as the inlet for the gas mixture that is to be fed into the reaction chamber, while a liquid outlet concurrently serves as an outlet for the residual gas that remains after the oxidation reaction. Both the liquid inlet and the liquid outlet for the liquid bath are situated below the liquid level in the reaction chamber. In particular, the internal pressure in the reaction chamber can be controlled by means of a valve installed in the liquid outlet.

The gas mixture containing hydrogen and oxygen accumulates in the device configured in this manner and this mixture is fed in via the liquid inlet, together with the liquid, into the reaction chamber above the liquid level, and then it comes into contact with the surface of the support, where the hydrogen and oxygen react catalytically. Due to the fact that the temperature in the liquid bath has been set below the condensation temperature of the water, the water formed condenses on the liquid surface in those areas of the support that are at a temperature above the condensation temperature of the water vapor. The reaction heat is transferred to the liquid bath by the support. An advantageous aspect in this context is that the catalytic oxidation can take place above the liquid level on the surface of the support at an elevated temperature, thus achieving a high degree of conversion, whereby a state of equilibrium is automatically established between the hydrogen oxidation and the dissipation of the generated reaction heat into the liquid bath. Self-regulation is also ensured due to the fact that, at a high rate of conversion and precipitation of the quantity of water thus formed, the volume of the gas mixture in the reaction chamber decreases, as a result of which the liquid level rises. The liquid volume thus increased, in turn, ensures greater heat dissipation, which prevents localized overheating of the support surface and reduces the temperature in the support. Then, once the conversion rate has decreased as a result of the smaller catalyst surface area, the gas volume increases once again in the reaction chamber, frees up a larger catalytically active surface and causes the conversion rate to rise once again. This self-regulation in the reaction chamber also makes it possible to overcome fluctuating concentrations of hydrogen in the gas mixture without having to accept the support surface's overheating to a temperature above the ignition temperature. If the external conditions, particularly the hydrogen concentration in the gas mixture, are constant, then a stable state is established between the catalytic reaction (recombination) and the heat dissipation. In the reaction chamber, the hydrogen oxidation gives rise to a defined water-vapor pressure that is largely dependent on the temperature in the liquid bath. A water bath is preferably employed as the liquid bath for the support.

As an alternative, for purposes of heat dissipation, the support is connected to a cooler that cools down part of the catalytically active surface of the support to a temperature that is below the condensation temperature of the water vapor formed in the reaction chamber. While part of the surface of the support remains at an elevated temperature and leads to increased conversion there, the cooled area allows condensation of the water vapor formed. The condensed water is discharged via a water outlet.

For both variants of the invention, it is advantageous to flush the reaction chamber with inert gas prior to the introduction of the gas mixture.

A preferred use for the devices according to the invention is the production of superpure water by means of electrolysis. The hydrogen-oxygen gas mixture generated in this process is directly conveyed into the reaction chamber of the devices and then converted once again into water on the catalytically active surface of the support.

BRIEF DESCRIPTION OF THE DRAWINGS

The invention will be explained in greater detail below with reference to examples of embodiments. The drawing schematically shows the following:

FIG. 1—the reaction chamber with the liquid bath into which the support is immersed together with its catalytically active surface;

FIG. 2—the reaction chamber with a support whose surface is coated with catalytically active materials and which is cooled by means of a cooler.

FIG. 1 schematically depicts a device in which the support 1, together with its catalytically active surface 2 that is suitable for hydrogen oxidation, is partially immersed into a liquid bath 3. In the embodiment shown, the support is arranged vertically in a housing 4 that surrounds the support and the liquid bath. The lower part 5 of the support 1 extends into the liquid bath 3, while its upper part is in a gas chamber 6 of the housing, which is sealed above the liquid bath so as to be gas-tight.

In the embodiment shown, the device is an integral component of an installation for electrochemically producing superpure water. The installation electrolytically generates a gas mixture that contains hydrogen and oxygen and whose hydrogen components are oxidized in the device and catalytically converted into water. The liquid bath 3 contains superpure water which had been previously produced in the installation.

In the embodiment shown, the hydrogen-oxygen gas mixture is fed in via a liquid inlet 7 that carries superpure water and this inlet is connected to the housing 4 and opens up into the liquid bath 3 below its liquid surface 8.

The gas mixture fed in through the liquid inlet 7 rises in the liquid bath 3 and collects above the liquid surface 8 in the gas chamber 6 of the housing 4. In the gas chamber 6, the gas mixture comes into contact with the catalytically active surface 2 of the support 1 so that the hydrogen present in the gas mixture reacts with the oxygen and, in an exothermal manner, is catalytically converted into water vapor. The reaction heat generated in this process heats up the gas chamber 6 and the support 1, whereby the lower part 5 of the support 1 transfers its heat to the liquid bath 3 and to the liquid that is flowing through the liquid bath. The amount of liquid that is conveyed through the liquid bath and that transports the heat is regulated in such a way that the temperature of the liquid bath is kept below the condensation temperature of the water formed in the gas chamber, and the catalytically formed water vapor can condense at least on the liquid surface 8, but also on the surface 2 of the support 1, provided that the surface temperature of at least partial areas of the surface does not exceed the condensation temperature.

As a result of the condensation of the water vapor that has been formed catalytically in the gas chamber 6, the gas volume in the gas chamber decreases so that, at a constant pressure in the liquid bath, the liquid level in the housing 4 rises. Water-gas mixture that subsequently flows in through the liquid inlet 7 can be used to once again change the liquid level in the housing. A liquid outlet 10 fitted with a valve 9 is connected to the housing 4 in such a way that, like the liquid inlet 7, it opens up below the liquid surface 8 of the liquid bath 3. The pressure in the housing can be regulated by means of the valve 9.

The device depicted in FIG. 1 functions in a self-regulating manner. If, for example, the activity of the catalytic surface increases as a result of a temperature rise when the support heats up because of reaction heat being released, the gas volume drops more rapidly as a consequence of the high rate of conversion, and the water level that rises in this process ensures the dissipation of a larger amount of heat. This prevents a further temperature increase on the catalytically active surface and causes the conversion rate to drop. When a gas mixture is once again fed in, then the water level drops again and a larger fraction of gas is converted on the catalytic surface that has once again become free and reaction heat is released. If the external conditions are constant, including the stream of liquid that flows through the liquid bath, then a stable state is established between the fed-in and the recombined volume of gas.

FIG. 2 schematically depicts a device where, in a housing 11, a support 12 that has a surface 13 that catalytically influences hydrogen oxidation is connected with a cooling element 14 in such a way as to conduct heat. The support 12 is arranged in the housing 11 in a gas chamber 15 into which the gas mixture containing hydrogen and oxygen can flow in via a gas-feed line 16. The fractions of hydrogen and oxygen fed in together with the gas mixture react catalytically on the surface 13 of the support 12 and the reaction heat released by this exothermal reaction heats up the gas chamber and the support. The support 12 is cooled off by the cooling element 14 and, at least in the partial areas of the support located close to the cooler, a temperature is established that is below the condensation temperature of water vapor. In these areas of the support and on the surface of the cooling element 14, insofar as the latter extends into the gas chamber 15, the water vapor formed on the catalytic support surface condenses in the gas chamber. In the embodiment shown in FIG. 2, the support is arranged vertically in the housing so that the water condensed on the surface 13 of the support can flow downwards and accumulate in a housing tub 17 from where it flows out via a water outlet 18.

The gas chamber 15 in the housing 11 is divided by the support 12 into two chamber areas 15a, 15b. Chamber area 15a serves to feed in the hydrogen-oxygen gas mixture via the gas-feed line 16, while a gas-discharge line 19 is connected to the chamber area 15b for the residual gas mixture that remains after the catalytic reaction of the hydrogen and oxygen that were brought in together with the gas mixture and their conversion into water and also after condensation of at least part of the water vapor that has been formed. The support 12 is installed in the housing 11 in such a way that the gas mixture flows in streams around the catalytically active surface 13 in the most encompassing manner possible. In the embodiment shown, the following is provided for this purpose:

the gas mixture is fed via the gas-feed line 16 into the gas chamber area 15a in such a way that the mixture first flows onto the support at its end 20 that is connected to the cooling element 14;

at the end 21 that is opposite from the cooling element 14, the support 12 has flow openings 22 through which the gas mixture, after flowing through the chamber area 15a of the gas chamber 15, is conveyed into the chamber area 15b;

the gas-discharge line 19 connected to the chamber area 15b, in turn, is located at the end 20 of the support 12 so that, also in the chamber area 15b, the entire surface of the support comes into contact with the gas mixture that is flowing through the gas chamber 15;

at the end 20 of the support 12, there is also an opening 23 for the condensed water that is flowing from the chamber area 15a into the chamber area 15b. The opening 23 is situated below the liquid level in the housing tub 17.

In the embodiments depicted in FIGS. 1 and 2, the supports consist of heat-conductive material, especially metal plates such as, for instance, stainless steel, which are coated with platinum (Pt) or palladium (Pd) or alloys of these metals as the catalysts. The housing can contain several supports so that the gas mixture is subjected to a forced conveyance (ands so is the water). In this manner, it is possible to improve the conversion carried out in the device.

The materials for the support and its dimensions should be selected as a function of the envisaged application, particularly as a function of the heat transport needed.

The device according to FIG. 1 made use of a 1-mm stainless steel coated with Pd and having a total surface area of 300 cm$^2$. The inlet and outlet for the superpure water were configured in such a way that water surrounded up to one-third of the surface of the support. Following flushing with inert gas, a gas mixture was fed into the gas chamber that contained 2.6 l/h of hydrogen ($H_2$), 1.3 l/h of oxygen ($O_2$), 0.74 l/h of nitrogen ($N_2$) and 0.13 l/h of water vapor ($H_2O$). The above-mentioned self-regulation of the course of the reaction gave rise to temperatures ranging from 70° C. to 150° C. [158° F. to 302° F.] at the hottest places of the support surface. The surface areas covered with water were at room temperature. The residual gas mixture flowing out via the liquid outlet 10 was separated from the liquid and analyzed. The measurements showed that the residual gas mixture still contained 0.189 l/h of $H_2$, 0.158 l/h of $O_2$, 0.765 l/h of $N_2$ and 0.03 l/h of $H_2O$. Relative to the gas mixture flowing in, this translated into conversion rates of 93% for the $H_2$ and 88% for the $O_2$.

List of reference numerals

Support 1
Surface 2
Liquid bath 3
Housing 4
Lower part of the support 5
Gas chamber 6
Liquid inlet 7
Liquid surface 8
Valve 9
Liquid outlet 10
Housing 11
Support 12
Surface 13
Cooling element 14
Gas chamber 15
Chamber areas 15a, 15b
Gas-feed line 16
Housing tub 17
Water outlet 18
Gas-discharge line 19
End of the support 20,21
Flow opening 22
Opening 23

What is claimed is:

1. Device for removing hydrogen from a gas mixture containing free hydrogen and oxygen by means of catalytic oxidation of hydrogen comprising a reaction chamber (6) having a support (1) secured in the reaction chamber, the support having a surface (2) coated with catalytically active materials, serving to dissipate reaction heat, an inlet (7) into the reaction chamber for the gas mixture, an outlet (10) for residual gas that remains after the oxidation of the hydrogen, a liquid bath (3), a part (5) of the catalytically active surface (2) of the support (1) immersed into the liquid bath (3), the temperature of the liquid bath (3) being below the condensation temperature of water vapor formed in the reaction chamber (6), whereby the inlet (7) for the gas mixture to be fed into the reaction chamber (6) concurrently serves as the inlet for the liquid bath (3) and the outlet (10) for the residual gas concurrently serves as the outlet for the liquid bath (3), and whereas both the inlet (7) and the outlet (10) are situated below a liquid level (8) in the reaction chamber (6) whereby the pressure in the reaction chamber is controlled.

2. Device according to claim 1, wherein the liquid bath (3) is a water bath.

3. Device according to claim 1, including an inert gas for flushing the reactor chamber with the inert gas prior to the introduction of the gas mixture.

\* \* \* \* \*